United States Patent [19]

Gorman et al.

[11] Patent Number: 4,822,857
[45] Date of Patent: Apr. 18, 1989

[54] METHOD OF GRAFTING SILANE COMPOUNDS TO BLOCK COPOLYMERS

[75] Inventors: John E. Gorman, Houston; John A. Morris, Katy, both of Tex.

[73] Assignee: Shell Oil Company, Houston, Tex.

[21] Appl. No.: 136,622

[22] Filed: Dec. 22, 1987

[51] Int. Cl.$^4$ ............................................. C08F 4/00
[52] U.S. Cl. ................... 525/245; 524/413; 524/432; 524/783; 525/288; 525/264
[58] Field of Search .................. 525/288, 245, 264; 524/432, 413, 783

[56] References Cited

U.S. PATENT DOCUMENTS

| | | | |
|---|---|---|---|
| 3,646,155 | 2/1972 | Scott | 525/288 |
| 4,048,129 | 9/1977 | Voight | 525/288 |
| 4,320,214 | 3/1982 | Harayama et al. | 525/264 |
| 4,366,107 | 12/1982 | Voigt et al. | 264/25 |

FOREIGN PATENT DOCUMENTS 58-132032A  8/1983  Japan.
58-225103A  12/1983  Japan.

Primary Examiner—Melvyn I. Marquis
Attorney, Agent, or Firm—Keith M. Tackett

[57] ABSTRACT

Alkoxy silane compounds such as vinyl-triethoxy-silane are more readily grafted to block copolymers in the presence of an amount of zinc oxide between about 0.15% and 1.5% by weight of the block copolymer. The silane modified block copolymer prepared with zinc oxide exhibits greater resistance to gel formation than silane-modified block copolymer prepared without the zinc oxide.

7 Claims, 1 Drawing Sheet

METHOD OF GRAFTING SILANE COMPOUNDS TO BLOCK COPOLYMERS

BACKGROUND OF THE INVENTION

Block copolymers having silane compounds grafted to the polymer chain such as described in Japanese Patent Nos. JS-8132-032-A and JS-8225-103-A are known in the art. The grafted silane compounds improve internal adhesion of the block copolymers and adhesion to non-polar substrates. The silane-modified block copolymers are typically prepared by extruder grafting with a free radical initiator.

U.S. Pat. No. 4,320,214 describes a process for grafting silanes to ethylene-type resins including the addition of zinc oxide which stabilizes the product. The zinc oxide is added during melt-kneading of the polymer and is stated to not reduce the rate of graft formation.

U.S. patent application Ser. No. 835,090, filed Feb. 28, 1986, now U.S. Pat. No. 4,783,504, describes a sealant composition possessing good UV stability, good oxidative stability, and good adhesion. The sealant composition includes a silane functionalized polymer component which is prepared by reacting enough silane of the general formula $RR'_n SiY_{3-n}$ (where n is 0, 1 or 2 and where R is a non-hydrolyzable organic group which is capable of grafting onto the polymer, R' is a non-hydrolyzable organic group incapable of grafting onto the polymer and Y is a hydrolyzable organic group) with a block polymer component to thereby functionalize the block polymer component and provide a resultant sealant composition with adhesion which is resistant to deterioration in the presence of water. The sealant composition may contain zinc oxide as a retardant which is added after the grafting reaction.

SUMMARY OF THE INVENTION

The present invention is a method for making a more stable silane-modified block copolymer which also promotes more efficient grafting of the silane compound to the block copolymer. The method comprises the addition of zinc oxide to the reactant mixture of the block copolymer and silane compound prior to completion of melt-kneading of the reactant mixture. The effective amount of the zinc oxide is between about 0.15 to 1.0w% based on the weight of the reactant mixture.

The silane functionalized polymer component comprises a block copolymer having at least one poly(monoalkenylarene) block and at least one hydrogenated poly(conjugated diene) block, preferably an A-B block copolymer or a multiblock copolymer having at least two poly(monoalkenylarene) endblocks A and at least one hydrogenated poly-(conjugated diene) midblock B, wherein the average molecular weights of the A blocks are between about 3000 and about 40,000 and the multiblock copolymer has a monoalkenyl arene content of between about 7% and about 45% by weight. The most preferred weight percent of the monoalkenyl arene of the multiblock copolymer is between 10% and 30%wt.

Other hydrogenated polymers may serve as the starting polymer component. These can include multiarmed polymers such as (A-B)a-Y-(C-A)b or (A-B)x-Y-Cy where A is a poly (monoalkenylarene) block, B and C are hydrogenated poly (conjugated diene) blocks and Y is the residue of a multifunctional coupling agent. If A =polystyrene(S), B=hydrogenated polyisoprene (EP), C=hydrogenated polybutadiene (EB) for example, these structure would be (S-EP)a-Y-(EB-S)b or (S-EP)x-Y-EBy.

DETAILED DESCRIPTION OF THE INVENTION

Figure 1:
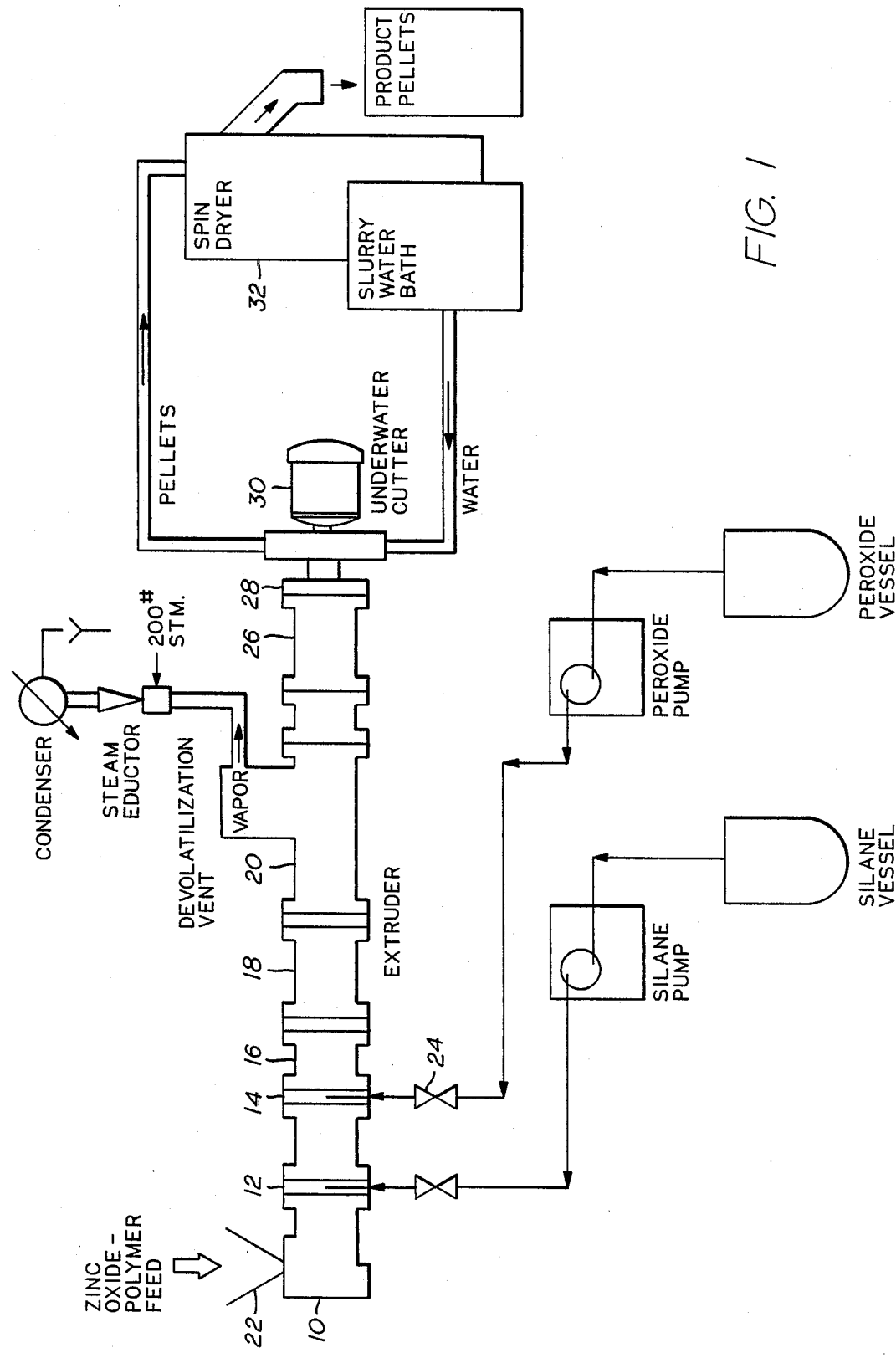
FIG. 1 illustrates a process for grafting silane compounds to a polymer in an extruder in accordance with the present invention.

The term "silane functionalized polymer component" refers to the combination of a multiblock copolymer and an A-B block copolymer reacted with a silane, such as the copolymer described in Japanese Pat. No. 58,225,103, owned by Sumitomo Bakelite Co., Ltd, laid open Dec. 27, 1983. Sumitomo Bakelite teaches the preparation of the desired component by reacting a hydrogenated styrene-butadiene-styrene copolymer with a silane of the general formula $RR'SiY_2$ (where R is a nonhydrolyzable organic group, Y is a hydrolyzable organic group and R' is either an R or Y group) at $\geq 140°$ C. in the presence of an organic peroxide (half-life of $\leq 6$ minutes at the reaction temperature) capable of generating free radicals in the hydrogenated styrene-butadiene-styrene copolymer. This component can be produced using the usual equipment for processing hydrogenated styrene-butadiene-styrene copolymers under normal processing conditions. The silane grafted polymer may be contacted with water in the presence of a silanol condensation catalyst in order to obtain a crosslinked hydrogenated styrene-butadiene-styrene copolymer product.

For the present invention, the copolymer preferably has a weight percent of about 10% to about 30% styrene.

In the general formula $RR'_n SiY_{3-n}$, where n is 0, 1 or 2, for the silane used in the present invention, R is a non-hydrolyzable organic group which is capable of grafting onto the polymer, R' is a non-hydrolyzable organic group incapable of grafting onto the polymer and Y is a hydrolyzable organic group. Examples of the R group are vinyl, allyl, butenyl, cyclohexenyl, cyclopentadienyl, methacryloxypropyl, etc. Vinyl is the most preferred. Examples of the Y group include alkoxy groups such as methoxy, ethoxy, butoxy, acyloxy groups such as formyloxy group, acetoxy, propionoxy; and oxime groups such as $-ON=C(CH_3)_2$, $-ON=C(C_6H_5)_2$; alkylamino groups, arylamino groups. Preferred silane compounds of the above described general formula include vinyltrimethoxysilane (VTMS) and vinyltriethoxysilane (VTES).

The amount of silane compound to be added to the copolymer component depends on the desired degree of crosslinking. From about 0.1 wt % to about 20 wt % of silane is used. Preferably, from about 0.5 wt % to about 10 wt % of silane is used.

The silane-functionalized polymer component is prepared using a free radical generator which consists of an organic peroxide which can generate free radicals in a typical hydrogenated styrene-butadiene-styrene copolymer at a reaction temperature resulting in a half-life of $\leq 6$ minutes and preferably less than 1 minute at the reaction temperature. Typical examples of organo peroxides are dialkyl peroxides such as dicumyl peroxide and 1,3-bis(tert-butylperoxyisopropyl)benzene. Other peroxides such as diacyl peroxides, alkyl peresters and percarbonates may be suitable for initiating graft sites on the polymer.

The amount of free radical generator to be added to facilitate the functionalization of the polymer component depends on the properties (copolymer composition and melt index) of the hydrogenated styrene-butadiene-styrene copolymer used and the desired degree of cross-linking as well as on the type of free radical generator. From about 0.01 wt % to about 3 wt % of free radical generator is added. Preferably from about 0.1 wt % to about 0.5 wt % of free radical generator is used.

In the first step of preparing the novel sealant composition of the present invention, the reaction between the hydrogenated styrene-butadiene-styrene copolymer and silane is executed in the temperature range between 140° C. up to the decomposition temperature of the hydrogenated styrene-butadiene-styrene copolymer. This reaction can be carried out in any appropriate device as long as an adequate dispersion of the added material and an adequate temperature of the kneaded material are achieved. For example, single or double screw extruders, the Ko-Kneader, the Banbury mixer or roll mills, may be used within the scope of the invention.

The silanization process shown in FIG. 1 consists of an extruder 10 which;

1. mixes VTES with the block copolymer in the feed zone 12 of the extruder 10;
2. uses peroxide addition in the melt zone 14 to degrade the polymer and activate the silanization reaction;
3. provides a special mixing zone 16 and residence time zone 18 in the extruder 10 to facilitate completion of the reaction;
4. provides a melt devolatilization zone 20 to remove entrained air, unreacted VTES, and decomposed peroxide products;
5. underwater pelletizes the final product; and
6. provides for pellet drying.

Developmental work was performed with a 2-inch Welding Engineers, Incorporated, non-intermeshing twin screw extruder with auxiliaries. VTES was injected into the feed zone 12 at about 7 diameters (D) from the feed inlet 22. Peroxide was injected into the melt zone 14 about 13 D from the feed inlet 22. Following the melt blister was the mixing zone 16 of 3.25 D and the residence time zone 18 of 5.25 D. These zones were designed to operate full of polymer thus providing additional residence time for the reaction. A devolatilization zone 20 of about 8 D was followed by a single screw pressuring zone 26 upstream of the die 28. A pressure of about 200 tor was held in the devolatilization zone 20. A GALA underwater pelletization system 30 was used throughout the study. Pellet residence time in the water was 30–45 seconds. Pellets were dried in a spin dryer 32.

The addition of zinc oxide at from about 0.15% to about 1.5% by weight of the polymer feed, preferably from 0.5% to 1.0%, was found to improve the stability of the grafted block copolymer product. The zinc oxide can be added with the polymer feed or at anytime before completion of melt-kneading of the reaction mixture in the extruder.

The invention is further illustrated by means of the following illustrative embodiments, which are given for the purpose of illustration only and are not meant to limit the invention to the particular components and amounts disclosed.

All experiments were carried out using KRATON ® G 1652 block copolymer crumb (available from Shell Chemical Co.), which is a polystyrene-hydrogenated polybutadiene-polystyrene copolymer, VTES, and Lupersol 101 which is 2,5-Dimethyl-2,5-Bis(t-Butyl Peroxy)Hexane. The extruder was purged with the block copolymer between runs except where noted otherwise. Analyses were made using gel permeation chromatography (GPC) to measure polymer degradation, IR for bound VTES content, A GC for residual VTES content, and a Mitsubishi moisture analyzer for water contents. Extruder feed rate was held at 100 lb/hr at a screw speed of 120 rpm. Since the desired bound VTES level was about 1.5%w, most runs were made at a VTES addition rate of 1.8%w.

In general, extruder functionalization using VTES was found to be prone to upsets causes by small feed impurities. For experimental runs made on the WEI system, analytical results are summarized in Table 1. Typical operating conditions with the addition of zinc oxide are summarized in Table 2.

Polymer degradation was found to be directly related to the peroxide addition level. It is theorized that this is due to free radicals which react with the VTES. In most cases when VTES was added there was no change in the degradation level. For some experiments, it is surmised that silanol crosslinking caused extra degradation.

VTES reaction efficiency was found to be directly related to the peroxide addition rate. Using VTES alone, over 0.20%w peroxide must be added to obtain a reaction efficiency of about 90%. The addition of small amounts of antioxidant to the feed decreases the reaction efficiency by about 20% (absolute). Impurities such as water decrease reaction efficiency by about 50% (absolute). Thus, feed impurities tend to be very deleterious to the operation.

Since about 0.20%w peroxide must be used to maintain a high efficiency, polymer degradation for commercial block copolymers is expected to be about 30%.

At high reaction efficiencies, residual VTES levels are governed by reaction efficiency rather than devolatilization efficiency. Thus, at about 90% efficiency, very little VTES will be removed from the devolatilization zone 20. However, any commercial facility will need a vacuum source and a system for disposal of VTES which is removed from the extruder 10. VTES reacts slowly with water to form innocuous silanols and silicone oils.

After making the first series of experimental runs in the WEI, equipment runs 201–207, the product was found to contain high levels of gel. Up to 50% gel was found in some samples. To develop a method of eliminating post reaction, an extensive set of experiments were run for which results are summarized in Table 1, Runs 208 to 239. These experiments evaluated the effect of:

1. Bound VTES content.
2. Addition of antioxidant for post stabilization.
3. Water as a feed impurity.
4. Zinc oxide which was used as an acid and impurity scavenger.
5. White oil which was used as an reaction modifier.
6. Two different lots of VTES.
7. Peroxide addition level (degradation level).
8. Surfactant in the pellet cooling water.

Because the post gel reaction sometimes took 10 to 14 days, a rapid method of determining gel was developed. This method consisted of dissolving 2 gms of polymer in 50 ml of THF, shaking the mixture for 30 minutes and observing if the pellets dissolved. Pellets having low gel contents would dissolve in about 15 minutes. Pellets having high gel contents would swell but not dissolve. From the results obtained, it is therorized that the long residence time in the WEI extruder (about 2 minutes) along with exposure to metal surfaces, allowed the VTES time to partially react in the extruder to form silanols. Given enough time the silanols crosslink to form siloxane gels. Gel formation is enhanced by (a) the addition of water or other impurities to the extruder feed, and (b) the higher bound VTES levels which accompany higher peroxide addition levels. Additional water or other impruities in the feed also significantly reduced the silanization reaction efficiency.

Zinc oxide was found to be an excellent acid and impurity scavenger. (It was later determined that the ammonium sulfate in KRATON® G 1652 block copolymer degrades to form sulphuric acid at about the 100 ppm level). Many runs were made using 1.0%w zinc oxide in the feed. All produced gel-free polymer (Runs 210, 211, 212, 232 and 233). To supply customers material for product evaluation, about 300 lb of polymer were produced using 1.0%w zinc oxide (Run 232-1 to 232-11). Not only did zinc oxide eliminate post reaction but it also enhanced VTES reaction efficiency. The effectiveness of zinc oxide was also demonstrated in Run 239 where both zinc oxide and water were added to the feed and the reaction efficiency remained at a 94% level. Further experiments were conducted to determine the lower level of zinc oxide required. A level of 0.15%w was found to be as effective as 1.0%w. At a level of 500 ppm reaction efficiency decreased by 16%. GPC analyses of typical reacted product indicated that crosslinking to extremely high mol wts was prevalent. It is assumed to be -Si-O-Si- crosslinking rather than carbon-to-carbon cross-linking. Silanol crosslinking was reduced substantially by using zinc oxide. At the 1.0 and 0.5%w zinc oxide level, excessive crosslinking was eliminated. At the 0.15% zinc oxide level, some silanol crosslinking was present. At the 0.050%w zinc oxide level, there was substantial silanol crosslinking. Hence, a zinc oxide level between 0.15 and 0.50% should be sufficient to eliminate silanol crosslinking during the extrusion operation. Also, it should be noted that feed impurities will vary, especially ammonium sulphate which varies from 100 to >400 ppm. Thus, some safety factor should be applied to the amount of zinc oxide used in the commercial operation.

The effect of other variables were:

1. VTES Level - Gellation increased as the bound VTES level increased. Levels below about 1.0% VTES did not gel. However, many product applications require VTES levels around 1.5%w.

2. Antioxidant Addition - AO addition did not decrease gellation but it did seriously decrease VTES reaction efficiency.

3. White Oil Addition - Oil addition to the feed was expected to inhibit crosslinking. Hence, an experiment was made using 10% oil (Run 236). Results indicated that gellation was eliminated but that reaction efficiency was substantially reduced.

4. VTES Lot - Runs 227 and 228 were conducted to establish the effect of using a different lot of VTES. As indicated both runs gave polymer having a high gel content.

5. Peroxide Addition Level - On the WEI machine it was found that at 0.10% peroxide addition, VTES reaction efficiency was low (about 65%). Thus at typical VTES addition rates of 1.8–2.0%, the polymer produced contained only about 1.0% bound VTES. At this low level, gel content was generally acceptable. However, when high amounts of VTES were added to the polymer (Runs 202 and 203), high gel levels were found. It was concluded that peroxide level, per se, does not effect gel level.

7. Surfactant in the Cooling Water - Soap can enhance the crosslinking of silanols. Hence, there was a possibility that Sulframin in the pellet cooling water could be detrimental. Runs made with surfactant, Runs 216 to 237, did not noticeably alter gel contents.

Product color throughout the runs was water white except when adding zinc oxide. With 0.5 to 1.0%w zinc oxide the product was an opaque white. With 500 ppm zinc oxide the pellets were slightly cloudy and at 0.15% zinc oxide somewhat cloudy but not opaque.

For bound VTES, an infrared spectroscopic method of analysis was developed. A thin film of polymer is pressed at a temperature of about 205° C. During the pressing operation all the free VTES is vaporized, thus leaving only bound VTES in the sample. The resulting film is scanned on an IR spectrophotometer through the range 2000/cm to 1000/cm. The intensity of the bands at 1110/cm (alkoxysilane) and 1040/cm (styrene double bonds) are measured. The ratio of these bands is calcualted and the bound VTES determined from a calibration curve which was constructed using neutron activation analyses.

For residual VTES, a standard GC method was developed. Since VTES will vaporize from samples stored at room temperature, refrigerated sample storage was required to insure accurate results.

The feasibility of producing VTES functionalized polymers on a commercial scale was demonstrated during two runs, (1) a short run in which no zinc oxide was added to the feed crumb, and (2) a 2.5 hr run where zinc oxide at the 1.0%w level was used. Runs were made at an operating rate of 4000 lb/hr. A summary of analytical results is given in Table 3. Operating conditions are given in Table 4. During the run, 10,000 lb of polymer were produced having a bound VTES content of 1.4 to 1.9%w with 1.0%w zinc oxide. According to GPC analyses, this material did not contain high mol wt crosslinked silanes and was soluble in THF after two weeks. Thus, it is concluded that no silane crosslinking occurred when zinc oxide was present. However, the run without zinc oxide was aborted soon after startup because of a pump failure. The one sample which was taken contained high mol wt polymer, and it was not soluble in THF (a strong indication of silane crosslinking). The average free VTES level during the run was about 0.55%w which was somewhat higher than expected. This could probably have been reduced by using a higher peroxide level.

TABLE 1
Summary of Process Development Runs for VTES Functionalized KRATON ® G 1652 Rubber

| Run | L101 Added, % w | VTES, % w Added | Bound | Efficiency | Other Feed | Gel |
|---|---|---|---|---|---|---|
| 201 | 0.10 | 1.0 | 0.6 | 60 | — | Yes |
| 202 | 0.10 | 2.3 | 1.75 | 76 | — | Yes |
| 203 | 0.10 | 1.8 | 1.5 | 83 | — | Yes |
| 204 | 0.25 | 1.8 | 1.75 | 97 | — | Yes |
| 205 | 0.25 | 2.7 | 2.7 | 100 | — | Yes |
| 206 | 0.25 | 2.3 | 2.15 | 93 | — | Yes |
| 207 | 0.25 | 1.0 | 1.0 | 100 | — | Yes |
| 208 | 0.10 | 1.75 | 0.7 | 40 | 0.3% AO 330 | No |
| 209 | 0.25 | 1.75 | 1.3 | 72 | 0.3% AO 330 | Yes |
| 210 | 0.25 | 1.75 | 1.75 | 100 | 1.0% ZnO | No |
| 211 | 0.10 | 1.75 | 1.3 | 75 | 1.0% ZnO | No |
| 212 | 0.25 | 1.75 | 1.7 | 94 | 1.0% ZnO | No |
| 213 | 0.25 | 1.75 | 1.4 | 78 | 0.3% AO 330 | No |
| 214 | 0.10 | 1.75 | 1.2 | 69 | — | Yes |
| 215 | 0.25 | 1.75 | 1.6 | 91 | — | Yes |
| 216 | 0.25 | 1.75 | 1.5 | 86 | —[a] | Yes |
| 217 | 0.10 | 1.75 | 1.1 | 63 | — | No |
| 218 | 0.15 | 1.8 | 1.1 | 61 | — | Yes |
| 219 | 0.20 | 1.8 | 1.3 | 72 | — | Yes |
| 220 | 0.25 | 1.8 | 1.3 | 72 | 0.1% AO 330 | Yes |
| 221 | 0.10 | 1.8 | 0.8 | 44 | 0.1% AO 330 | No |
| 222 | 0.10 | 1.8 | 0.8 | 44 | 0.2% AO 330 | No |
| 223 | 0.25 | 1.8 | 1.1 | 61 | 0.2% AO 330 | Yes |
| 224 | 0.25 | 1.8 | 0.9 | 50 | 0.2% Water | Yes |
| 225 | 0.25 | 1.8 | 0.8 | 44 | 1.0% Water | Yes |
| 227 | 0.25 | 1.8 | 1.5 | 84 | New VTES | Yes |
| 228 | 0.25 | 1.8 | 1.0 | 56 | New VTES | Yes |
| 232 | 0.20 | 2.0 | 1.9–2.0 | 95–100[b] | 1.0% ZnO | No |
| 233 | 0.15 | 2.0 | 1.6 | 80 | 1.0% ZnO | No |
| 234 | 0.20 | 2.0 | 1.9 | 95 | 0.5% ZnO | No |
| 235 | 0.20 | 0 | — | — | 10% Oil | — |
| 236 | 0.20 | 1.8 | 1.4 | 78 | 10% Oil | No |
| 237 | 0.20 | 1.8 | 1.4 | 78 | 500 ppm ZnO | No |
| 238 | 0.20 | 1.8 | 1.7 | 94 | 0.15% ZnO | No |
| 239 | 0.20 | 1.8 | 1.7 | 94 | 1.0% ZnO + 0.2% Water | No |

[a]Started using Sulframin surfactant in pellet cooling water.
[b]Covers 11 analyses during 300 lb run.

TABLE 2
Typical Operating Conditions for WEI Experimental Runs

| | |
|---|---|
| Polymer | KRATON ® G1652 crumb dusted with 1.0% w zinc oxide |
| Feed Rate | 100 lb/hr |
| Screw Speed | 120 rpm |
| Lupersol rate | 0.2 lb/hr |
| VTES rate | 1.8 lb/hr |
| Melt Temperature | |
| at VTES inlet plate | 450° F. |
| at first blister | 486° F. |
| at mixing zone | 430° F. |
| at die | 428° F. |
| Zone temperature settings | |
| zone (barrel 11) | 386° F. |
| zone (die) | 416° F. |
| Die temperature settings | 450° F. |
| Melt pressure | |
| before blister | 1000–1100 psig |
| after blister | 280–310 psig |
| at mixing zone | 160 psig |
| at die | 900 psig |
| at die | 1100 psig |
| VTES injection pressure | 620 psig |
| Lupersol injection pressure | 1050 psig |
| Vent pressure | 100–200 tor |
| Pelletor speed | 1500 rpm |
| Pelletor current | 2.2 amps |
| Pelletor holes | 12 |
| Slurry water temperature | 120° F. |
| Water flow rate | 10–20 gpm |
| Surfactant content | 0.01 to 0.1% w Sulframin 85 |
| Defoamer content | 0.1% w |

TABLE 3
Summary of Results from Commercial Run

| Run and Time | Lupersol Added, % w | VTES Added, % w Added | Bound[b] | Residual | Efficiency[b] | Polymer Deg. % w[d] | Gel |
|---|---|---|---|---|---|---|---|
| RP-6502-2 (1.0% zinc oxide) | | | | | | | |
| 1700[a] | 0.20 | 2.0 | 2.6 (2.5) | 0.57[a] | 100 (100) | 29 | None |
| 1730 | 0.20 | 2.0 | 1.5 (1.7) | 0.53 | 75 (85) | 26 | None |
| 1800 | 0.20 | 2.1 | 1.4 (1.6) | 0.48 | 67 (80) | 28 | None |
| 1830 | 0.20 | 2.1 | 1.6 (1.9) | 0.55 | 76 (90) | 27 | None |
| 1900A | 0.20 | 2.1 | 1.9 | — | 90 — | 28 | None |
| 1900B | 0.20 | 2.1 | 1.8 (1.7) | 0.55 | 86 (83) | 28 | None |

TABLE 3-continued

Summary of Results from Commercial Run

| Run and Time | Lupersol Added, % w | VTES Added, % w | | | | Polymer Deg. % w[d] | Gel |
|---|---|---|---|---|---|---|---|
| | | Added | Bound[b] | Residual | Efficiency[b] | | |
| RP-6501-1 (No ZnO) | | | | | | | |
| 1144 | 0.20 | <1.0 | 0.7 | — [a] | — 70[c] | 30 | High |

[a]Unit probably not lined out.
[b]First analyses done at site, second done at laboratory
[c]Addition pump broke down about time of sample.
[d]Area loss of main GPC peak.

TABLE 4

Typical Operating Conditions for Commercial Run

| | |
|---|---|
| Feed Rate | 4000 lb/hr KRATON ® G1652 polymer crumb |
| Screw Speed | 300 rpm |
| Power | 950 Amps |
| Torque | 48% |
| Barrell Temperature | |
| Feed Zone | Cooling |
| All other zones | 450° F. |
| Die | 500° F. |
| Vent Pressure | 5.5" Hg (vent was partially plugged before operation was begun) |
| VTES Addition Rate | 82 lb/hr (about 2.1% w basis crumb feed) |
| Peroxide/oil Addition Rate | 12.2 lb/hr (about 0.2% w peroxide basis crumb feed) |
| Melt Temperatures | |
| At end of barrel | 433° F. |
| At entrance to die | 433° F. |
| Melt pressure at Die | 500 psig |
| Pelletor | |
| Holes | 270 @ 0.110 in. diameter |
| Speed | 1800 rpm |
| Amps | 2.0 |
| Water temperature | 110° F. |
| Surfactant | None |
| Knives | Six bladed |
| Dusting level | 1800 ppm |

What is claimed is:

1. A method of making silane-modified block copolymers, comprising the steps of:

melt-kneading a mixture of an alkoxy-silane compound having at least one unsaturated radical, a free radical initiator, and a block copolymer having at least one poly(monoalkenylarene) block and at least one hydrogenated poly(conjugated diene) block; and including in the mixture an amount of zinc oxide of at least about 0.15%w of the mixture prior to completion of the melt-kneading step.

2. The method according to claim 1, wherein the amount of the alkoxy silane compound is between about 0.1% and about 20% by weight.

3. The method according to claim 2, wherein the amount of the alkoxy silane compund is between 0.5% and 10% by weight.

4. The composition according to claim 1, wherein said poly(monoalkenylarene) block of the block copolymer is polystyrene and said hydrogenated poly(conjugated diene) block of the block copolymer is hydrogenated polybutadiene.

5. The composition according to claim 4, wherein said block copolymer is a selectively hydrogenated linear polystyrene-polybutadiene-polystyrene block copolymer.

6. The composition according to claim 5, wherein said alkoxy silane compound is vinyl-triethoxy-silane.

7. The composition according to claim 6, wherein the zinc oxide is present at an amount between about 0.50 to about 1.0 wt %.

* * * * *